United States Patent [19]

Clark et al.

[11] Patent Number: 4,615,739
[45] Date of Patent: Oct. 7, 1986

[54] OIL-IN-WATER-IN-OIL COATING COMPOSITION

[75] Inventors: Leonard R. Clark, Olive Branch, Miss.; Robert W. West, Memphis, Tenn.

[73] Assignee: Formby's Inc., Memphis, Tenn.

[21] Appl. No.: 706,777

[22] Filed: Feb. 28, 1985

[51] Int. Cl.⁴ .......................... C09K 3/00; C08L 3/00
[52] U.S. Cl. ...................................... 106/34; 106/212; 524/53
[58] Field of Search ..................... 524/53; 106/212, 34

[56] References Cited

U.S. PATENT DOCUMENTS

| | | | |
|---|---|---|---|
| 2,565,602 | 8/1951 | Fisher et al. | 427/291 |
| 2,637,705 | 5/1953 | Auer | 8/562 |
| 2,681,322 | 6/1954 | Auer | 524/45 |
| 2,907,624 | 10/1959 | Saville | 8/617 |
| 2,907,721 | 10/1959 | Auer | 524/26 |
| 3,395,028 | 7/1968 | Mackles | 106/10 |
| 4,432,797 | 2/1984 | Vasishth et al. | 106/34 |

*Primary Examiner*—Theodore Morris
*Attorney, Agent, or Firm*—Salvatore R. Conte; George W. Rauchfuss, Jr.

[57] ABSTRACT

An oil-in-water-in-oil coating composition comprising (a) an oil continuous phase comprising a solution of an oil soluble resin or drying oil or mixtures thereof in a water immiscible solvent, (b) an aqueous discontinuous phase comprising an emulsion with pH of about 4 to 10 of water insoluble resin in an aqueous medium, and (c) an effective dispersing amount of a dispersing agent for dispersing (b) in (a) consisting essentially of hydrated starch or a hydrated starch component.

10 Claims, No Drawings

OIL-IN-WATER-IN-OIL COATING COMPOSITION

FIELD OF THE INVENTION

This invention relates to liquid multiphase coating compositions capable of having a low volatile organic content (VOC) and excellent weathering, wetting, adhesion and stability characteristics. More particularly, this invention relates to an oil-in-water-in-oil coating composition comprising a water-immiscible liquid or solution as the continuous oil phase, an emulsion of a water insoluble resin in an aqueous medium as the discontinuous phase and hydrated starch or a hydrated starch component as a dispersing agent for dispersing the latter oil-in-water phase in the former oil phase.

BACKGROUND OF THE INVENTION

For years coatings have been used to protect or change the appearance of various substrates. Three types of coatings most commonly available are paints, stains and clear coatings. A paint is any pigmented liquid, liquefiable or mastic composition designed for application to a substrate in a thin layer which is converted to an opaque solid film after application. Paints generally contain higher non-volatiles (NV) than stains. A stain is a transparent, semitransparent or opaque solution or suspension of coloring matter (dyes or pigments or both) in a vehicle, designed to color a surface without hiding it, or to color a material into which it is incorporated. Stains are generally lower in viscosity and pigment content than paints and tend to penetrate more into the substrate than paints. Clear coatings are generally colorless or near colorless transparent liquids which form transparent protective and/or decorative films upon application, although they may contain low concentration of colorless pigments.

All coating compositions contain a resinous or resin-forming constituent called the "binder" which can be a liquid such as a drying oil or a resin that can be converted to a solid gel in the final coating. In some instances, where the binder is either a solid or is too viscous to be applied as a fluid film, a volatile solvent or "thinner" is also added. This evaporates after a liquid film is deposited, and the evaporation causes solidification of the film into the desired coating.

Pigments added to coating compositions are insoluble powders of very fine particle size, as small as 0.1 micron and can be up to about 20 microns. The binder together with the pigment and other conventional coating additives make up the non-volatile (NV) or film-forming part of the liquid coating composition.

Coating compositions may be classified into two very broad groups: (1) aqueous types of solutions or emulsions, which use water as the primary liquid or continuous phase; and (2) non-aqueous types of solutions or suspensions, which use organic solvents, such as hydrocarbons or oxygenated compounds as the primary liquid or continuous phase. Many of the same pigments and other components used in coating compositions can be used in both the aqueous and non-aqueous types of coatings.

The non-aqueous type of coatings generally contain an oil-soluble alkyd resin either alone or in combination with certain other film-forming agents such as drying oils. The non-aqueous coatings are generally made by blending the alkyds and drying oils with colored pigments, extender pigments such as clays and silicates, in a volatile organic solvent. In addition, metallic soaps (driers), such as cobalt, calcium, manganese and the like naphthenates are added to speed the dry time of these coatings. Also added may be such additives as anti-settling compounds, dispersing agents, flatting agents, adhesion promoters, water-proofing agents, mildewcides, and film preservatives, among others.

These non-aqueous coatings are characterized by good wetting penetration and adhesion to the substrate. The long term weathering of these coatings, however, often results in the occurance of one or more of the following problems: embrittlement, cracking, blistering, fading and chalking. Additionally, these non-aqueous solutions are flammable and present air pollution problems because of the volatile organic compounds used as solvents.

The aqueous type of coatings is characterized by the use of emulsion polymers as the binders for these products. The polymers are made by the emulsion polymerization of such compounds as vinyl acetate, methyl methacrylate, ethyl acrylates, styrene-butadiene, etc. These emulsion polymers may be blended with pigments, extender pigments, and water to make coatings. Also added are such items as freeze-thaw agents, coalescing agents, dispersing agents, mildewcides, thickeners, etc. These aqueous coatings exhibit excellent weathering characteristics because of the high molecular weight associated with the polymers used. Because of the water content, there is less VOC emission than with non-aqueous products. However, since the polymer film forms by coalescing, these aqueous products tend not to penetrate nor bond as well as their non-aqueous counterparts. They are furthermore subject to such phenomena as poor adhesion, a phenomenon known as tissue paper peeling and will raise the grain of wood.

In recent years there have been many attempts to overcome the shortcomings of the above-mentioned non-aqueous solution and emulsion type of coatings. One method has been to modify non-aqueous solution resins so that they become water soluble or water dispersable so as to avoid solvent emission and flammability problems and still yield good penetration and bonding to the substrate. Another method has been to emulsify such items as alkyd resins or drying oils into a latex emulsion such as acrylic latex resins, so as to improve bonding to and adhesion to the substrate, yet leave a high molecular weight film on the surface. In both cases, the resultant coatings suffer one or more detriments, such as poor storage stability, slow drying, difficulty in manufacture, and loss of long term weathering. The basic approach in both these systems has been to add, by some means, the resins to the water in such a manner that the water is the continuous phase.

It has now been found, however, that the non-aqueous solution and emulsion type of coatings may be modified by the addition of an aqueous latex emulsion into the non-aqueous coating composition so that the non-aqueous phase is continuous and the aqueous latex is dispersed or suspended therein. By using hydrated starch or a hydrated starch component as the dispersing agent, coating compositions can be made that will have the aqueous phase as the discontinuous phase dispersed throughout the non-aqueous continuous phase.

OBJECTS OF THE INVENTION

One object of this invention is to produce an oil-in-water-in-oil coating composition having a non-aqueous continuous phase and an aqueous discontinuous phase dispersed therein which contains emulsified water insoluble polymers or resins.

Another object is to produce such a coating composition with low VOC, a favorable environmental consideration relating to the use of volatile organic solvents.

A further object is to produce such a coating composition with good wetting and bonding characteristics and which will deposit a high molecular weight film on an applied surface with excellent weathering characteristics.

A still further object is to produce such a coating with good waterproofing characteristics.

An additional object is to produce a commercially viable, stable paint, stain or clear coating which will accomplish said objectives.

SUMMARY OF THE INVENTION

An oil-in-water-in-oil coating composition comprising (a) an oil continuous phase comprising a solution of an oil soluble resin or drying oil or mixtures thereof in a water immiscible solvent, (b) an aqueous discontinuous phase comprising an emulsion of water insoluble resin in an aqueous medium, and (c) an effective dispersing amount of an agent for dispersing (b) in (a) consisting essentially of hydrated starch or a hydrated starch component.

DETAILED DESCRIPTION OF THE INVENTION

The subject coating compositions preferably contain the three essential components in the indicated approximate relative percent by weight proportions:

| Component | % w/w |
| --- | --- |
| Oil continuous phase | 20-95 |
| Aqueous discontinuous phase | 4-70 |
| Hydrated dispersing agent* | 1-10 |

*Based on active solids

The oil continuous phase in the subject coating compositions comprises a solution of an oil soluble resin or drying oil or mixtures thereof in a water immiscible solvent. As the oil soluble resin, an alkyd or modified alkyd resin is preferred although other thermosetting resins such as, for example, epoxy ester resins, polyurethane resins and the like, may be utilized.

Alkyd resins are thermosetting hydroxycarboxylic resins prepared by the condensation of a polybasic acid or anhydride with a polyhydric alcohol. The most common polybasic acid used is phthalic anhydride, although other acids used in the preparation of alkyd resins include sebasic acid, maleic acid, azelaic acid, adipic acid and succinic acid. Other acids which may be substituted on a molar basis are fumaric acid and isophthalic acid. The most common polyhydric alcohol used is glycerol. Other suitable polyhydric alcohols are, for example, ethylene glycol and trimethylolpropane (2,2,-dihydroxymethyl-1-butanol).

For commercial applications, the alkyd resin is preferably modified by a monobasic acid of which the vegetable oil fatty acids are typical. This modification produces desirable qualities in the resin particularly when it is used as a film forming constituent in a coating composition. The monobasic acid is preferably admixed during the formation of the resin. Examples of suitable modifying acids of this type are, but not limited to, linseed fatty acids, soya fatty acids, coconut fatty acids, conjugated linseed fatty acids, pelargonic acid, castor oil fatty acids and dehydrated castor oil fatty acids. Additionally, triglyceride oils such as, for example, tung oil, linseed oil, soy bean oil and the like, may be used to derive the foregoing fatty acids in situ as well as part of the polyhydric alcohol, glycerol, by the transesterification of the triglyceride oil with additional polyhydric alcohol during the preparation of the resins.

The quantities of these ingredients in the alkyd resin will vary over a wide range according to the characteristics of the particular constituents being used and may readily be determined in each case by one skilled in the art. Generally the polybasic acid content of the alkyd resin may range from 15 to 45%; the monobasic acid content may range from 15 to 55%; with the polybasic alcohol being the remainder.

Alkyds may be additionally modified by combining them with various glycols. Examples of glycols commonly used are pentaerythritol diethylene glycol. More drastic changes in alkyd properties can be produced by crosslinking them by the addition of isocyanates such as toluene di-isocyanate. The latter alkyds are commonly called urethane modified alkyds. Urethane modified alkyds dry to much harder finishes than alkyds not so modified. Other examples of modified alkyds include modification by reacting them with natural resins such as rosin, or with other synthetic resins such as phenolics, amino resins, silicone resins and the like or by reacting them with imides, styrene, and the like.

The final molecular weight or the degree of polymerization of the alkyds is controlled by adding controlled amounts of an excess of one of the reactants—fatty acids or glycols. Consequently the finished alkyds generally contain small amounts of unreacted hydroxyl, or acid groups, or both. Alkyds produced by using relatively low ratios of synthetic polybasic acid to fatty acid are called long oil alkyds, those produced with very high ratios are called short oil alkyds, and those produced with intermediate ratios are called medium oil alkyds.

These alkyd and modified alkyd resins are well known in the paint, stain and coating industry and are commercially available from a number of different manufacturers, as are other oil soluble resins, for example, epoxy ester resins, polyurethane resins and the like. The present invention is not limited to the type of oil soluble resin.

Any drying oil that dries to a hard film may be used. Typical such oils utilized in coating compositions include linseed oil (preferred), oiticica oil, tung oil and perilla oil. One or more of such drying oils may be used.

In general, the oil phase is prepared by blending the resin or drying oil into the water immiscible solvent. With the resin alone, from about 10 to about 90 percent by weight is preferably dissolved in the solvent. With the drying oil alone, from about 10 to about 50 percent by weight is preferred. With mixtures of resin and drying oil, from about 10 to about 95 percent by weight, wherein the ratio of drying oil to resin should not exceed about 3:1, is preferred. Conventional coating additives such as, for example, colored and extender pigments, driers, waterproofing agents, etc., may optionally be added, generally from about 0.1 (without pigments) to about 60 (with pigments) percent by weight.

The water immiscible solvent, or oil phase, in which the alkyd resin and/or drying oil are blended to form the oil continuous phase of the subject compositions is an organic solvent; examples of such include a petroleum distillate such as, for example, mineral spirits, VMP naphtha, kerosene, mineral oil and the like; a terpenic solvent such as, for example, turpentine, pine oil and the like; or some combination thereof.

The discontinuous phase in the subject coating compositions comprises an oil-in-water emulsion, or "latex", of dispersed water insoluble, organic film-forming, polymeric resins in an aqueous phase, with a pH range of about 4–10. Typical such resins include acrylic polymers or copolymers, vinyl homopolymers or copolymers and styrene-butadiene. Preferred herein are the acrylic resins, including homopolymers and copolymers of alkyl (1–8 carbons) acrylates and methacrylates and copolymers of such monomers with acrylonitrile, styrene and similar vinyl monomers. As the aqueous phase of the latex, water itself may be the suspending medium or water containing various amounts of water soluble or water miscible organic liquids generally used in coating compositions. These liquids include the various mono and polyhydric alcohols, such as the alkylene glycols, the glycol ethers, the ether alcohols, the ketones, and particularly the lower alcohols and glycols such as ethyl alcohol, propyl alcohol, ethylene glycol, propylene glycol and the like.

The polymeric resin, or "binder", is present in the latex in the form of very fine particles, generally with an average particle size ranging between 0.01 micron up to about 3.0 microns and preferably between 0.1 and 1.0 micron. Commercial latex products such as aqueous latex paints may contain various conventional additives in addition to the polymeric resin binder such as pigments, pH control agents, mildewcides, etc. Also included are emulsifying agents or surfactants to help wet and disperse the polymeric and pigment particles, to emulsify liquids and to function as defoamers. For purposes of this invention, anionic and nonionic types of surfactants are suitable but not the cationics.

In general, the aqueous discontinuous phase is prepared by dispersing the polymeric resin in the aqueous phase together with other suitable conventional coating and stabilizing ingredients optionally added. Usually, the aqueous dispersion comprises from about 2 to about 65, preferably 5–15, percent by weight of the polymeric resin binder. Other common additives which may be optionally added such as pigments, surfactants, defoamers, etc., generally make up from about 0.5 to about 20 percent by weight of the total latex composition.

The composition of the polymeric resin binder is not particularly critical and, although acrylics are preferred, various other polymers and copolymers may be used, including a natural rubber, a styrene resin, a styrene-butadiene resin, a vinyl resin (e.g. derived from a vinyl alkanoates such as acetate, propionate and the like) and combinations thereof. In general, the polymeric resin binders are well known in the art and commercially available.

Typical commercial latexes of water insoluble resins that may be utilized in preparation of the discontinuous phase of the subject coating compositions are those marketed by the Union Oil Company, Chemicals Division, Schaumburg, IL, under its "Amsco" trademark with various RES-numerical designations such as, for example, the styrene butadiene type RES 4104 (pH 9.0); the vinyl acrylic type RES 682 (pH 4.5); the acrylic type RES 745 (pH 7.5); the styrene acrylic type RES 210 (pH 7.5); and the polyvinyl acetate type RES 3001P (pH 4.5). Other suitable latexes are available from different manufacturers, for example, the water dispersable urethane types marketed by the Spencer-Kellog Division of Textron, Inc., Buffalo, N.Y., under its "Spensol" trademark, e.g. L-44 and L-51; the ethylenevinyl chloride type marketed by Air Products & Chemicals, Inc., Allentown, PA, under its "Airflex" trademark, e.g. 4514 and 4530; and the acrylic types marketed by the Rohm & Haas Company, Inc., Philadelphia, PA, under its "Rhoplex" trademark, e.g. AC-33, AC-64, AC-630 and AC-829.

The dispersing agent in the subject coating compositions for dispersing the aqueous discontinuous phase in the oil continuous phase is hydrated starch or a hydrated starch component. Starch, which is a mixture of amylose (M.W. = 100,000–210,000) and amylopectin (M.W. = 1,000,000–6,000,000), may be derived from such vegetable and grain sources as corn (preferred), wheat, potato, tapioca, rice, sage and grain sorghum. Most cereal starches contain 22–26% amylose and 74–78% amylopectin. Root starches are slightly higher in amylopectin, while corn and waxy milo starch contain almost 100% amylopectin. At the other extreme, mutant forms such as high amylose corn starch and wrinkled pea starches contain 60–80% amylose.

Chemically, starch is a homopolymer of alpha-D-glucopyranoside of two distinct types. The linear polysaccharide, amylose, has a degree of polymerization on the order of several hundred glucose residues connected by alpha-D-(1→4)-glucosidic linkages. The branched polymer, amylopectin, has a DP (degree of polymerization) on the order of several hundred thousand glucose residues. The segments between the branched points average about 25 glucose residues linked by alpha-D-(1→4)-glucosidic bonds while the branched points are linked by alpha-D-(1→6)-bonds, (see "The Encyclopedia of Chemistry", published by Van Nostrand Reinhold Company Inc., New York, N.Y. 4th Ed., p. 878–880, 1984).

It is essential to the coating compositions of this invention that the starch or starch component be hydratable in aqueous media. One of the most important properties of starch granules is their behavior on heating with water. On heating, water is at first slowly and reversibly taken up and limited swelling occurs, although there are no perceptible changes in viscosity and birefringence. At a temperature characteristic for the type of starch, the granules undergo an irreversible rapid swelling and lose their birefringence, and the viscosity of the suspension increases rapidly (hydrated or gelled stage). At higher temperatures starch diffuses from some granules and others are ruptured leaving formless sacs. Hydration may be enhanced by numerous chemicals including strong bases and metallic salts, although magnesium sulfate is known to impede gelatinization (see "Encyclopedia of Chemistry", Edtd. by G. L. Clark et al, Reinhold Publishing Corp., New York, N.Y., 1st Ed., p. 884–886, 1957).

In hydrating the starch or starch component, an amount of water is utilized which, at a minimum, is sufficient to effectively form a hydrated gel, although excess water may be advantageously employed. Generally, from about 20 to about 60 weight percent, and preferably from about 30 to about 50 weight percent, of water is used based on the total weight of the two ingredients; the dry weight of the starch or starch component being the "active solids". A mixture of water and a low molecular weight polyhydric alcohol, for example, glycerol or an alkylene glycol such as ethylene glycol, propylene glycol and the like, preferably in about a 1:1 ratio, may also be used to hydrate the starch or starch component. The lower the average molecular weight of the starch component, the less water or water-polyhydric alcohol solvent is needed.

The term "starch component" is used broadly herein to encompass starch which has been modified, for example, by chemical means, degradation, etc. Starches, which behave as polyhydroxy alcohols, can be chemically modified whereby the chemical structure of some of the D-glucopyranosyl units in the molecule are changed. Typical modification procedures include oxidation, esterification and etherification. For example, oxidized starches are prepared usually by the action of hypochlorite or peroxide. In the former case, sodium or calcium hypochlorite is added to a slightly alkaline starch slurry and the reaction allowed to take place at 30°–50° C. until the desired degree of oxidation is reached. Excess oxidizing agent may be neutralized by the addition of sodium bisulfite. Oxidized starches made with sodium hypochlorite, however, generally have low gelling tendency so that the subsequent introduction of such acidic functions as carboxyl, sulfonate or sulfate groups, or the subsequent hydrolysis into smaller segments containing hydroxy or carboxyl groups, will facilitate hydration. The oxidized starches used herein, whether oxidation precedes or follows hydrolysis, should have a sufficient degree of carboxylation to ensure hydratability in aqueous media, generally not more than one COOH group per saccharide unit and, preferably, from about 0.6 to about 0.8 COOH group per saccharide unit. Oxidized starches without hydrolysis, which will generally have from about 0.1 to about 0.2 COOH group per saccharide unit, may be advantageously utilized herein.

Starch is capable of ether formation with alkyl and acyl halides and alkyl sulfates, and of ester formation with both inorganic and organic acids. However, only those starch ethers and starch esters which are capable of hydration in aqueous media are suitable herein. This factor will influence the amount and the selection of etherifying and esterifying agents utilized. Starch is substantially a polymer of glucose having three hydroxyl groups for each repeating unit and by converting all or substantially all of the hydroxyl groups of each saccharide (anhydroglucose) unit to ether or ester groups, the respective etherized or esterified starch may then be characterized as having a degree of substitution or D.S. value of 3.0. This is the maximum degree of substitution but lower D.S. values can be obtained by controlling the relative amounts of the reactants. Furthermore, an etherifying agent or esterifying agent that will itself introduce groups of a hydrophilic nature can enhance the hydratability of the so modified starch. Typical are the half-esters having a low D.S. value, usually less than 0.1, obtainable by esterification with an acylating agent consisting of at least one cyclic anhydride of polycarboxylic acids, such anhydrides being adequately described in column 9, line 27 et seq., of U.S. Pat. No. 4,061,610.

Generally, the hydrophobicity of the starch increases as the degree of substitution increases as indicated by the solubility characteristics of the modified starches which changes from a water-soluble, organic-insoluble at low degrees of substitution to water-insoluble, organic-soluble at high degrees of substitution. For example, the starch half-esters having the necessary degree of substitution are esters which are soluble in water, but insoluble in organic solvents. In general, a D.S. value below about 0.5 is advantageously suitable herein, and preferably less than 0.1 and as low as 0.0001.

The degradation of the high molecular weight starch into starch segments of shorter molecular weight, such as by various known processes of hydrolysis and dextrinization, also provides starch components for use herein. Preferably, the degraded starch segments have an average molecular weight of at least about 10,000 and, more preferably, from about 50,000 to about 250,000. Starch components having a lower average molecular weight may also be utilized, provided they sufficiently maintain their hydratable nature in aqueous media to adequately provide the dispersing action required in the subject compositions.

Acid-catalyzed or enzyme-catalyzed hydrolysis of an aqueous suspension of starch shortens the molecular chains in the starch granule to yield a starch hydrolysate of lower molecular weight polysaccharides. In turn, the starch hydrolysate may be modified, for example, as shown in U.S. Pat. No. 4,061,610, by conversion into starch half-esters having unreacted carboxyl groups pendant from the backbone of the starch esters which may be further neutralized with suitable base and thereby ensure hydratability in aqueous meda. The unreacted carboxyl groups in such starch components as, for example, the mixture of polysaccharides obtained from hydrolyzed starch, oxidized-hydrolyzed starch, hydrolyzed-oxidized starch and the like, may be further reacted, that is, partially or entirely neutralized with suitable base such as, for example, alkali and alkaline earth metal hydroxides, ammonia or ammonium hydroxide, an alkyl amine such as trimethylamine, triethylamine, etc., a trialkanolamine such as triethanolamine, etc., and the like bases. Such neutralized starches exhibit enhanced water solubility and have excellent hydratability characteristics in aqueous media.

Partial hydrolysis products precipitated from aqueous solution by alcohol were reported as dextrorotatory and, hence, were named "dextrins". Dextrinization may also occur by dry-roasting, which causes depolymerization of starch and condensation of starch segments, as well as by chemical modes, for example, see U.S. Pat. Nos. 2,127,204 and 2,131,724.

Among the preferred starch components herein are the modified starches which have been subjected to hydrolysis in the modification process, such as, for example, (i) hydrolyzed starch, (ii) hydrolyzed starch preceded by oxidation (oxidized/hydrolyzed starch), (iii) oxidized starch preceded by hydrolysis (hydrolyzed/oxidized starch) and (iv) subsequently neutralized (i) through (iii) starches, the latter neutralized starches being most preferred.

A particularly suitable commercial preparation of a chemically modified naturally occurring polysaccharide is marketed by Lorama Chemicals, Inc., Dorval, Quebec, Canada, under its trade name, JK-270. By analysis, this product contains about 45 weight percent of a blend of hydrolyzed and oxidized starch segments mixed into an aqueous glycol solvent system of about 30 weight percent water, about 22 weight percent propylene glycol and about 3 weight percent ethylene glycol, wherein the residual carboxylic acid functionality of the segments has been neutralized to about pH 6.4–6.8 with either ammonia or a low molecular weight amine. The blend of neutralized starches, one of higher average molecular weight ranging between 50,000–200,000 and one or lower average molecular weight ranging between 1,000–20,000, is in a respective ratio of about 10:1.

The coating compositions of this invention are readily prepared by using art-recognized principles and methodologies in mixing the ingredients together and in choosing the type of mixing or dispersing equipment to be used. Example 2 provides a general listing of components, both essential and optional, in the order in which they can be advantageously mixed and illustrates a procedure for making the subject compositions. In general, the hydrated starch or hydrated starch component is first dispersed, for example, by mechanical dispersing means, into the solution of oil soluble resin and/or drying oil (oil phase) to obtain a homogeneous dispersion of the hydrated starch therein. To this dispersion is then added the aqueous emulsion of water insoluble resin with thorough blending to achieve the final product. It is essential that the starch or starch component be hydrated before incorporation into the oil phase. Failure to hydrate results in a final product which has the aqueous phase rather than the oil phase as the continuous phase.

Other conventional coating additives, if appropriate, may obviously be utilized and incorporated into either the oil soluble resin solution or the water insoluble resin emulsion or both as best suited based on solubility, dispersibility, etc. considerations. Such additives include but are not limited to colored pigments, extender pigments, fillers, driers, water-proofing agents, anti-skinning agents, volatile organic thinners, preservatives, mildewcides, U.V. absorbing agents, pH regulators, surfactants and the like.

The subject coating compositions have beneficial commercial and industrial applications, particularly in the area of paints, stains and clear coating compositions as illustrated in the Examples. The hydrated starch or hydrated starch component facilitates incorporation of a relatively substantial amount of a water based emulsion of insoluble resin, such as an acrylic latex, PVA emulsion, etc., into an oil phase, such as an oil based paint, stain, etc. The resultant product, which is a multiphase emulsion of the oil-in-water-in-oil type, provides the best of both techniques, that is, excellent penetration and bonding in a substrate such as wood, for example, and a highly durable weather resistant film surface as the water phase evaporates. Because of this relatively high water content and relatively low VOC content, the subject coating compositions can be formulated to meet or substantially comply with environmental standards. For example, coating compositions are obtainable with a VOC content of not more than 250 grams per liter for paints and not more than 350 grams per liter for opaque stains in accordance with Rule 107 of the South Coast Air Quality Management District (SCAQMD) of California. This low VOC aspect provides the subject coating compositions with a substantial benefit over presently available coating compositions.

EXAMPLE 1

A. Oxidized Starch

B. Oxidized/Hydrolyzed Starch

C. Oxidized/Hydrolyzed/Neutralized Starch

In this example, a modified starch is prepared by oxidation followed by hydrolysis, yielding a mixture of polysaccharide segments with carboxylic acid functionalities (confirmed by infra-red spectroscopy) which are then neutralized with ammonia to increase water solubility. Forty grams of corn starch are mixed with 25 grams of propylene glycol and 60 grams of 7.15% NaClO in water. This mixture is heated to 80°–100° C. for about 15–20 minutes until the mixture hydrates into a gel (A). To this hydrated gel of oxidized starch 6 g of 12N hydrochloric acid are added followed by 10–20 g of water to reduce the viscosity. The temperature of 80°–100° C. is maintained until the liquid is clear. The hydrated material (B) is then cooled to room temperature and neutralized with 29% ammonium hydroxide to pH 6.8 (C).

EXAMPLE 2

Waterproofing Stain

The hydrated oxidized/hydrolyzed/neutralized starch-derived mixture of polysaccharides (C) obtained in Example 1 is incorporated into the following formulation to provide a water-proofing stain.

| Ingredient | % | grams |
|---|---|---|
| 1. Oxid/Hyd/Neut starch (Ex. 1) | 10.0 | 40.0 |
| 2. Medium oil alkyd resin (55% NV) | 5.0 | 20.0 |
| 3. Extender pigment[a] | 6.5 | 26.0 |
| 4. Red iron oxide pigment | 5.0 | 20.0 |
| 5. Linseed oil | 5.0 | 20.0 |
| 6. Micronized wax[b] | 2.0 | 8.0 |
| 7. Paraffin wax (crude) | 1.5 | 6.0 |
| 8. Mineral spirits | 12.5 | 50.0 |
| 9. Cobalt naphthenate 12% drier | 0.15 | 0.6 |
| 10. Calcium naphthenate 8% drier | 0.15 | 0.6 |
| 11. Cobalt naphthenate 21% drier | 0.05 | 0.2 |
| 12. Anti-skinning agent[c] | 0.25 | 1.0 |
| 13. Deionized water | 41.6 | 166.4 |
| 14. Acrylic resin emulsion[d] (65% NV) | 10.0 | 40.0 |
| 15. Bacteriostatic preservative[e] | 0.2 | 0.8 |
|  | 100.0 | 400.0 |

[a]Sodium potassium aluminum silicate
[b]Finely ground straight chain hydrocarbon wax, average particle size of 3 microns, m.p.: 100–106° C., commercially available from Micro-Powders Inc., Yonkers, N.Y.
[c]Methyl ethyl ketoxime.
[d]An acrylic latex oil-in-water emulsion (about 35% water) commercially available from Union Oil, Union Chemicals Division, Schaumburg, IL under its trademark: AMSCO RES 6510.
[e]"Nuosept 95", trademark of Tenneco Chemicals, Piscataway, N.J.

Ingredients (1) through (4) are added to a mixing vessel and ground under high shear in a high speed disc disperser (2 inch diameter disc; 1000–1200 r.p.m.) for 5–10 minutes in order to disperse the pigments and hydrated starch component into the resin solution; average size of pigments less than 40 microns. The linseed oil (5) and the micronized wax (6) are then blended into the dispersion. The paraffin wax (7) is dissolved in the mineral spirits (8) to which the driers (9) through (11) and the anti-skinning agent (12) are added and mixed. The latter mixture of ingredients (7) through (12) are combined with the dispersion of ingredients (1) through (6) in the mixing vessel and the temperature of the vessel brought to 30°–40° C. The water (13), acrylic resin emulsion (14) and preservative (15) are blended together and slowly added over 1–2 minutes to the mixing vessel using moderate mixing speed (about 500–700 rpm) with additional stirring for 3–5 minutes. The resultant water-proofing stain exhibits excellent stability and, when applied to a wood surface, the resultant coating exhibits excellent waterproofing, durability and fade-resistant characteristics. An equivalent amount of hydrated oxidized starch (A) and hydrated oxidized/hydrolyzed starch (B) obtained from Example 1 is substituted, respectively, for ingredient (1) in the formulation of this example to provide alternative embodiments of a waterproofing stain.

EXAMPLE 3

Hydrolyzed Starch

Forty grams of corn starch are added to 60 g of water and 4 g of 12N HCl in a suitable vessel and hydrolyzed into a mixture of polysaccharides by heating to 65°–80° C. until the liquid becomes clear. Substitution of 32 grams of this hydrated hydrolyzed starch for the 40 grams of hydrated oxid/hyd/neu starch (1) in Example 2, together with an additional 8 grams water (14), provides another variation of a waterproofing stain of this invention.

EXAMPLE 4

Starch

A. Fifty grams of corn starch are added to 50 g distilled water and stirred until homogeneous. The mixture is then heated to about 80° C. with stirring until a hydrated gel is obtained, about 10–15 minutes, and then cooled to room temperature.

B. Forty-five grams of corn starch are added to 30 g distilled water containing 25 g propylene glycol. The mixture is stirred until homogeneous and then heated to about 80° C. and stirred until a hydrated gel is obtained, about 10–15 minutes, and then cooled to room temperature.

C. Substitution of an equivalent amount of the hydrated starch from A and B, respectively, for the 40 g of hydrated oxid/hyd/neu starch (1) in Example 2 provides additional variations of a waterproofing stain in accordance with this invention.

EXAMPLE 5

| Stain | | |
|---|---|---|
| Ingredient | % | Gram(s) |
| 1. Hydrolyzed starch (Ex. 3) | 8.0 | 32.0 |
| 2. Long oil alkyd resin (60% NV) | 5.0 | 20.0 |
| 3. Extender pigment | 7.0 | 28.0 |
| 4. Red iron oxide pigment | 5.0 | 20.0 |
| 5. Mineral spirits | 14.0 | 56.0 |
| 6. Linseed oil | 6.0 | 24.0 |
| 7. Anti-skinning agent | 0.25 | 1.0 |
| 8. Cobalt naphthenate 6% | 0.25 | 1.0 |
| 9. Manganese naphthenate 6% | 0.20 | 0.8 |
| 10. Water | 44.1 | 176.4 |
| 11. Acrylic latex resin (65% NV) | 10.0 | 40.0 |
| 12. Lampblack toner | 0.20 | 0.8 |
| | 100.00 | 400.0 |

The ingredients are mixed according to the procedure outlined in Example 2. Lampblack toner (12) is added after admixture of all the other ingredients to adjust the final color of the product. Substitution of an equivalent amount of commercially available modified starch resin, JK 270, for ingredient (1) affords another embodiment of this stain formulation.

EXAMPLE 6

| | Percent (%) | | | |
|---|---|---|---|---|
| Ingredient | A | B | C | D |
| JK-270 | 8.0 | 8.0 | 8.0 | 10.0 |
| Medium oil alkyd (50% NV) | 5.0 | 7.0 | 5.0 | |
| Modified soya oil alkyd (50% NV) | | | | 10.0 |
| Extender pigment | 7.0 | 5.0 | 6.0 | |
| Calcium carbonate (filler) | | | 5.0 | |
| Titanium dioxide | | 5.0 | | |
| Red iron oxide | 5.0 | | | |
| Yellow iron oxide | | 7.0 | | |
| Paraffin wax (crude) | 3.0 | | | |
| Linseed oil | 5.0 | 7.0 | 5.0 | 10.0 |
| Mineral spirits | 13.0 | 17.0 | 13.0 | 15.0 |
| Anti-skinning agent | 0.25 | 0.25 | 0.25 | 0.4 |
| Cobalt naphthenate 6% | 0.25 | 0.25 | 0.20 | 0.25 |
| Manganese naphthenate 6% | 0.20 | | | |
| Calcium naphthenate 8% | | 0.20 | 0.20 | 0.20 |
| Water | 43.1 | 31.0 | 47.35 | 42.15 |
| Acrylic latex (65% NV) | 10.0 | 12.0 | 10.0 | 12.0 |
| Bentonite | | 0.3 | | |
| Lampblack toner | 0.2 | | | |
| | 100 | 100 | 100 | 100 |

A = waterproofing stain
B = paint
C = tint base for stain
D = clear coating

EXAMPLE 7

| Waterproofing Stain | | |
|---|---|---|
| Ingredient | % | grams |
| 1. JK-270 | 8.0 | 32.0 |
| 2. Medium oil alkyd resin (55% NV) | 5.0 | 20.0 |
| 3. Extender pigment | 6.5 | 26.0 |
| 4. Red iron oxide pigment | 5.0 | 20.0 |
| 5. Linseed oil | 5.0 | 20.0 |
| 6. Micronized wax | 2.0 | 8.0 |
| 7. Paraffin wax (crude) | 1.0 | 4.0 |
| 8. Water-sealer[a] | 5.0 | 20.0 |
| 9. Mineral spirits | 12.5 | 50.0 |
| 10. Cobalt naphthenate 12% drier | 0.15 | 0.6 |
| 11. Calcium naphthenate 8% drier | 0.15 | 0.6 |
| 12. Cobalt naphthenate 21% drier | 0.05 | 0.2 |
| 13. Anti-skinning agent | 0.25 | 1.0 |
| 14. Deionized water | 43.7 | 184.8 |
| 15. Acrylic resin emulsion (65% NV) | 10.0 | 40.0 |
| 16. Bacteriostatic preservative | 0.2 | 0.8 |
| | 100.0 | 400.0 |

[a]Waterproofing composition containing 10% NV in mineral spirits, commercially available from Richardson-Vicks Inc., Home Care Products Division, Memphis, TN, under its trademark: Thompson's Water Seal.

The above ingredients are mixed as in Example 2 with the water-sealer (8) being incorporated into the mineral spirits mixture. The resultant waterproofing stain exhibits substantially no separation or settling even after one year and excellent heat stability even after three months at 50° C. The VOC for this product is determined to be about 190 grams per liter by SCAQMD Rule 107.

We claim:

1. An oil-in-water-in-oil coating composition comprising (a) an oil continuous phase comprising a solution of an oil soluble resin or drying oil or mixtures thereof in a water immiscible solvent, (b) an aqueous discontinuous phase comprising an emulsion with pH of about 4 to 10 of water insoluble resin in an aqueous medium, and (c) an effective dispersing amount of a dispersing agent for dispersing (b) in (a) consisting essentially of hydrated starch or a hydrated starch component.

2. The composition of claim 1 wherein said dispersing agent is hydrated starch.

3. The composition of claim 1 wherein said starch component is a mixture of polysaccharides obtained by the hydrolysis of starch.

4. The composition of claim 1 wherein said starch component is a mixture of polysaccharides obtained by treating starch to the consecutive processes of oxidation and hydrolysis or hydrolysis and oxidation.

5. The composition of claim 1 wherein said starch component is a mixture of polysaccharides obtained by treating starch to the consecutive processes of oxidation, hydrolysis and neutralization.

6. The composition of claim 1 wherein said mixture of polysaccharides is obtained by treating starch to the consecutive processes of hydrolysis, oxidation and neutralization.

7. The composition of claim 1 having from about 20 to about 90 weight percent of (a); from about 4 to about 70 weight percent of (b) and from about 1 to about 10 weight percent of (c) based on the dry weight of said starch or said starch component.

8. The composition of claim 1 which is a stain.

9. The composition of claim 1 which is a waterproofing stain.

10. The composition of claim 1 which is a paint.

* * * * *

UNITED STATES PATENT AND TRADEMARK OFFICE
CERTIFICATE OF CORRECTION

PATENT NO. : 4,615,739
DATED : October 7, 1986
INVENTOR(S) : Leonard R. Clark and Robert W. West It is certified that error appears in the above-identified patent and that said Letters Patent is hereby corrected as shown below:

Column 11, lines 12 and 32, change "/neu" to read -- /neut --.

Signed and Sealed this

Twenty-sixth Day of March, 1991

Attest:

HARRY F. MANBECK, JR.

Attesting Officer

Commissioner of Patents and Trademarks